3,677,898
ACID PROTEASE AND METHOD OF PREPARING THE SAME

Koji Mitsugi, Takashi Nakase, and Yoshisuke Hasegawa, Kanagawa-ken, Japan, assignors to Ajinomoto Co., Inc., Tokyo, Japan
No Drawing. Filed Jan. 27, 1970, Ser. No. 6,276
Claims priority, application Japan, Jan. 31, 1969, 44/7,175
Int. Cl. C12d *13/10*
U.S. Cl. 195—62      7 Claims

ABSTRACT OF THE DISCLOSURE

An acid protease which is not inactivated by sodium lauryl sulfate and is stable at 50° C. at pH 1.5 to 6.0 for two hours can be recovered from media on which certain yeasts of the genus Rhodotorula weer cultured. It is useful in the hydrolysis of soybean protein and of other proteins.

---

This invention relates to acid protease and to the preparation thereof by fermentation.

It is known that various molds produce protease, but the alkaline protease derived from *Candida lipolytica* is the only known protease derived heretofore from yeast (Japanese Pat. No. 41/10,194).

It has now been found that yeast of the genus Rhodotorula can produce large amounts of acid protease extracellularly in a culture medium which may be of conventional composition.

Strains of Rhodotorula which have been found effective in producing the acid protease of the invention include *Rhodotorula glutinis* AJ–5193 (NRRL Y–7220) and *Rhodotorula aurantiaca* AJ–4860 (NRRL Y–7219). Specimen cultures of these microorganisms are available to qualified persons without our permission from the U.S. Department of Agriculture, 1815 N. University St., Peoria, Ill. They were isolated from soil samples taken in Osaka, Japan, and identified by comparison of their characteristics with data in "The Yeasts, a Toxonomic Study," 1952, by Lodder and Kreger van Ryi, and in the "Journal of General and Applied Microbiology" [26 (1960) 207–208].

*Rhodotorula glutinis* AJ–5193 had the following characteristics:

Growth in yeast-malt broth at 25° C. for 3 days:
Cells are round, short oval to oval, sometimes long oval, 2.5–5×3–7.5µ and occur singly or in pairs. An incomplete ring and sediments are formed.

Growth on yeast-malt agar at 25° C. for 10 days:
A streak culture is light reddish orange to pink, smooth, soft, shining, and has an entire margin.

Sporulation: Absent.
Formation of pseudo- and true mycelia: Absent.
Fermentation: Absent.

Assimilation of carbon compounds—

D-glucose, D-galactose, saccharose, maltose, L-sorbose (latent), cellobiose, trehalose, raffinose, melezitose, D-xylose, L-arabinose, D-arabinose, D-robose, glycerol (latent), adonitol, duleritol (latent), D-mannitol, D-sorbitol, α-methyl-D-glycoside (latent), salicin, potassium gluconate, succinic acid and citric acid are assimilated.

Lactose, melibiose, inulin, soluble starch, L-rhamnose, ethanol, erythritol, calcium 2-ketogluconate, DL-lactic acid and inositol are not assimilated.

Potassium nitrate is utilized as the sole nitrogen source.
Urease: Positive
Thiamine is required at 25° C.
Gelatin is not liquefied (pH 6.2, 25° C.).

*Rhodotorula aurantiaca* was similarly identified.

The culture media on which the yeasts of the invention may be cultured are not unusual. They must include sources of assimilable carbon and nitrogen, and growth promoting organic nutrients. Suitable carbon sources include glucose, starch hydrolyzate, n-paraffins, acetic acid, and gluconic acid. Nitrogen may be provided by ammonium sulfate, urea, or ammonium phosphate. Effective growth promoting agents include corn steep liquor, yeast extract, soybean or casein hydrolyzate, casamino acid, meat extract, and various vitamins. The list of ingredients for suitable aqueous culture media is presented merely by way of example, and numerous other effective sources of carbon and nitrogen and growth promoting agents are available. Glucose and proteins of high molecular weight are the preferred carbon and nitrogen sources respectively.

The culture medium should be kept acid at pH 1.5 to 4, and significant amounts of protease are not produced in a neutral medium although the growth of the microorganisms is not impaired by the higher pH of the medium, as is evident from Table I, relating to *Rhodotorula glutinis* AJ–5193.

TABLE I

| | Initial pH | | | | | |
|---|---|---|---|---|---|---|
| | 3.0 | | | 7.0 | | |
| Culture period | Final pH | Growth | Activity (u./ml.) | Final pH | Growth | Activity (u./ml.) |
| 2 days | 2.05 | 0.860 | 41.2 | 6.2 | 0.730 | 3.2 |
| 3 days | 1.9 | 0.820 | 62.8 | 6.3 | 0.850 | 0.8 |
| 4 days | 1.9 | 0.750 | 73.2 | 6.7 | 0.766 | 2.0 |
| 5 days | 1.9 | 0.750 | 74.2 | | | |

In the two tests whose results are listed in Table I, the culture media employed each contained 5 g./dl. glucose, 1 g./dl. yeast extract, 0.5 g./dl. $Kh_2PO_4$, 0.04 g./dl. $MgSO_4 \cdot 7H_2O$, and 2 p.p.m. Fe and Mn ions. They differed in pH only. The growth of *Rhodotorula glutinis* AJ–5193 was determined from the light absorbancy of the broth at 560 mµ when diluted with 25 volumes of water. The protease activity was determined as follows:

3 ml. 1.5% milk casein solution in $\frac{1}{10}$ M lactic acid-sodium lactate buffer of pH 3.0 was mixed with 1 ml. diluted protease solution. The protease solution was kept at 37° C. for six minutes prior to mixing, and the mixture was incubated at the same temperature for 10 minutes. Thereafter, 4 ml. 0.4 M trichloroacetic acid solution were added, and the mixture was filtered after 25 minutes. 1 ml. of the filtrate was mixed with 5 ml. 0.4 M sodium carbonate solution and 1 ml. Folin reagent. The amount of arylamino acid released into trichloroacetic acid-soluble fraction at 37° C. in 10 minutes was determined from the light absorbancy of the mixture at 660 mµ. A protease unit (u.) is the activity of a protease which releases 1 µg. of tyrosine into trichloroacetic acid soluble fraction per minute.

The protease may be recovered from the culture medium in a conventional manner as by salting out, precipitation by water miscible organic non-solvents, chromatographic separation, and the like, as will be partly illustrated below.

The acid protease recovered from culture broth of *Rhodotorula glutinis* AJ–5193 and *Rhodotorula aurantiaca* AJ–4860 has characteristic properties not simultaneously present in other acid proteases.

The optimum pH for proteolysis of a milk casein substrate is 2.0 to 2.5, and the optimum temperature is 60° to 65° C. at which the optimum pH is 2.5. The enzyme is not inactivated to a measurable extent by heating in aqueous solution to 50° C. for two hours at pH 1.5 to 6.0. It is not inactivated in aqueous solution by sodium lauryl sulfate, and thereby distinguished from mold-derived acid protease.

The specific protease activity of the enzyme of the invention in units per gram is four times that of commercial pepsine and 2.5 times that of "Molsine," the trade name of an acid protease derived from a mold.

The following examples further illustrate the invention.

EXAMPLE 1

50 ml. batches of a culture medium containing 5 g./dl. glucose, 0.3 g./dl. $KH_2PO_4$, 0.04 g./dl. $MgSO_4 \cdot 7H_2O$, 2 p.p.m. Fe, 2 p.p.m. Mn, and 1 g./dl. yeast extract, and adjusted to pH 3.0 were placed in 500 ml. shaking flasks, sterilized at 115° C. for 10 minutes and inoculated with *Rhodotorula glutinis* AJ–5193 which had previously been cultured on a slant of the same composition. Each flask was kept at 31° C. with shaking for four days. The culture broth then contained 120 u./ml. acid protease.

1.5 liters of the culture broth were centrifuged to remove the yeast cells, and the liquid so obtained was cooled and mixed with 55% (by volume) acetone to precipitate impurities which were removed by centrifuging. The supernatant liquor was then mixed with enough acetone to make its acetone content 75%, whereby the acid protease was precipitated. It was separated from the liquid by centrifuging and dried in a vacuum. The crude enzyme powder weighed 1.45 g.

1 g. enzyme powder was dissolved in 200 ml. citric acid-HCl buffer solution of pH 4.0, and the solution was passed over a chromatographic column packed with cross-linked dextran (Sephadex G–100) which provided a hydrophilic, insoluble molecular sieve, the dimensions of the column being 8 cm. x 200 cc. The chromatographic medium had been pretreated with the buffer solution. The effluent was collected in fractions, and the fractions having acid protease activity were combined, mixed with acetone, and kept overnight in an ice box whereby a colorless, crystalline precipitate was formed. After repeated recrystallization from acetone, 0.62 g. crystalline acid protease was obtained. It showed maximum absorption bands at 280 m$\mu$ and minimum absorption bands at 230 m$\mu$, and had an extinction coefficient $$E^{280}_{1\%} = 10.0$$

The specific acid protease activity of the crystalline material was 5.24 times that of crystalline pepsine obtained from Sigma Chemical Co. and having an extinction coefficient $$E^{280}_{1\%} = 12.4$$

EXAMPLE 2

A culture medium containing 5 g./dl. glucose, 0.3 g./dl. $KH_2PO_4$, 0.04 g./dl. $MgSO_4 \cdot 7H_2O$, 1 g./dl. casamino acid, 50 $\mu$g./dl. vitamin $B_1$, 2 p.p.m. Fe, and 2 p.p.m. Mn was adjusted to pH 2.5, inoculated with *Rhodotorula glutinis* AJ–5193, and cultured with shaking at 25° C. for four days. The culture broth had an acid protease activity of 190 u./ml. From 3.5 liters of the broth, 5.35 g. crude enzyme powder were recovered as described in Example 1.

EXAMPLE 3

A culture medium containing 9.0 g./dl. glucose, 0.3 g./dl. $KH_2PO_4$, 0.04 g./dl. $MgSO_4 \cdot 7H_2O$, 2 p.p.m. each of Fe and Mn, and 1 g./dl. soybean protein extract, and having a pH of 3.0 was inoculated with *Rhodotorula aurantiaca* AJ–4860 and cultured at 31.5° C. for four days. The culture broth then had an acid protease activity of 100 u./ml., and an enzyme powder was recovered from the broth as described above.

What is claimed is:

1. A method of preparing a protease having its optimum protease activity against a milk casein substrate at a pH of 2.0 to 2.5 and at an optimum temperature of 60° to 65° C., said protease being not deactivated by sodium lauryl sulfate in aqueous solution, and being stable in aqueous solution at 50° C. and at a pH of 1.5 to 6.0 for two hours, which method comprises:

(a) culturing a yeast of the species *Rhodotorula glutinis* or *Rhodotorula aurantiaca* in an aqueous medium under aerobic conditions until said medium has extracellular activity of said protease; and (b) recovering said protease from said medium.

2. A method as set forth in claim 1, wherein said medium contains sources of assimilable carbon and assimilable nitrogen, and growth promoting organic nutrients.

3. A method as set forth in claim 2, wherein said carbon source is glucose, and said nitrogen source a protein.

4. A method as set forth in claim 1, wherein said yeast is *Rhodotorula glutinis* NRRL Y–7220.

5. A method as set forth in claim 1, wherein said yeast is *Rhodotorula aurantiaca* NRRL Y–7219.

6. A method as set forth in claim 1, wherein said yeast is cultured in said medium at a pH of 1.5–4.

7. An acid protease produced by a yeast of the genus Rhodotorula, said protease having its optimum protease activity against a milk casein substrate at a pH of 2.0 to 2.5, and at an optimum temperature of 60° to 65° C., said acid protease not being deactivated by sodium lauryl sulfate in aqueous solution, and being stable in aqueous solution at 50° C. and at a pH of 1.5 to 6.0 for two hours.

References Cited

UNITED STATES PATENTS 3,492,204  1/1970  Koaze _____ 195—66

LIONEL M. SHAPIRO, Primary Examiner

U.S. Cl. X.R.

195—66 R